Patented May 1, 1923.

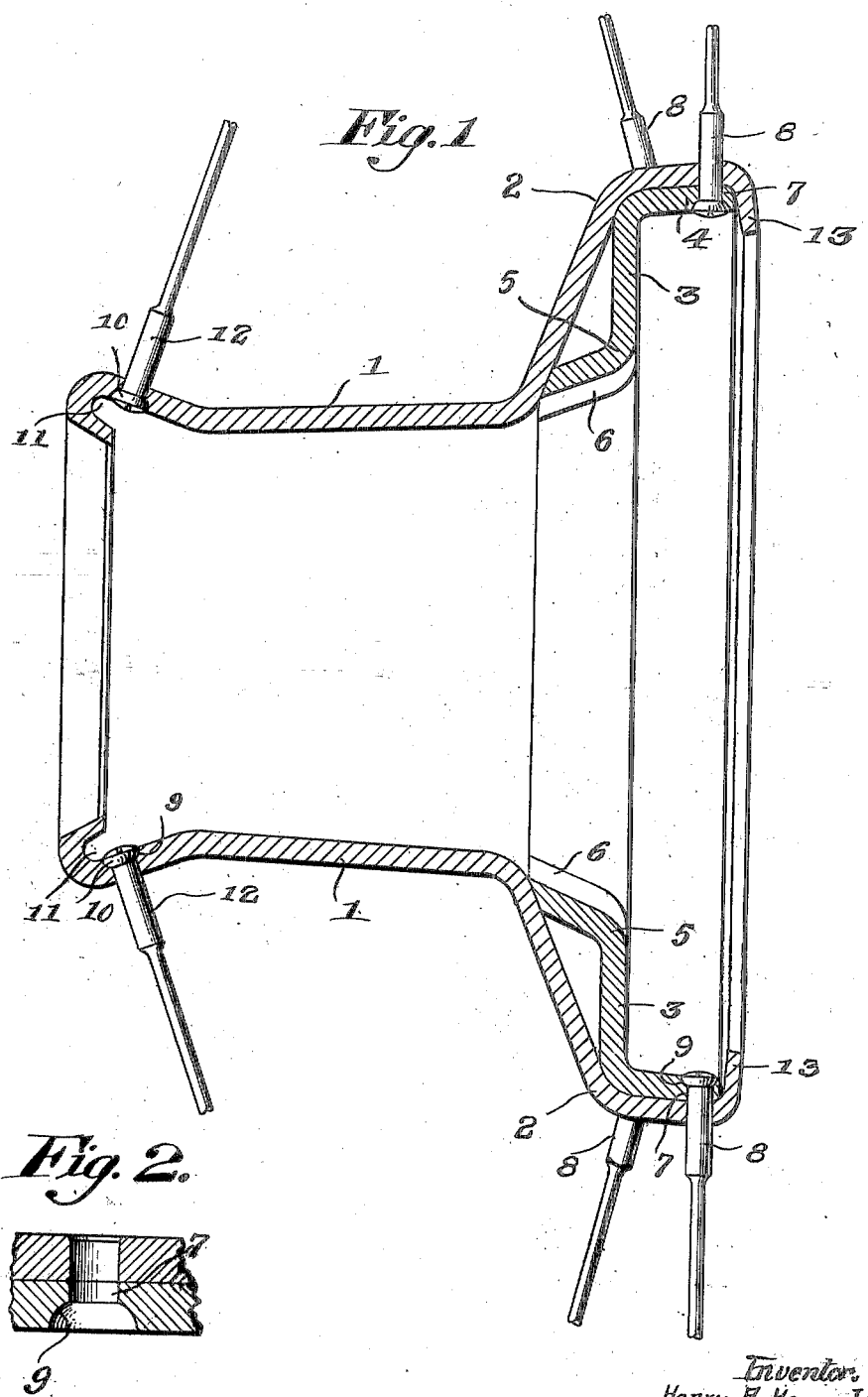

1,453,356

UNITED STATES PATENT OFFICE.

HENRY A. HOUSE, JR., OF BUFFALO, NEW YORK, ASSIGNOR TO WIRE WHEEL CORPORATION OF AMERICA, OF BUFFALO, NEW YORK, A CORPORATION OF NEW YORK.

WHEEL.

Application filed September 24, 1919. Serial No. 325,852.

*To all whom it may concern:*

Be it known that I, HENRY A. HOUSE, Junior, a citizen of the United States, and resident of Buffalo, Erie County, State of New York, have invented certain new and useful Improvements in Wheels, of which the following is a specification.

This invention relates to an improvement in wheels and particularly to an improvement in the hub shell construction of demountable wheels. The type of hub shell shown in my application Serial No. 77441 filed February 10, 1916, has the driving portion embodied in the shell. While this type has proven very satisfactory it is desired to lighten the shell and to provide a separate element which will embody the driving portion and also have a stiffening function.

One object of this invention is to provide a hub shell with means for reinforcing or stiffening the inner end of the shell.

Another object of this invention is to provide a hub shell with separate means embodying the necessary driving portion of the wheel thus permitting the formation of a light but rigid shell.

Further objects of this invention will appear from an examination of the specification and drawings.

Referring to the drawings which form a part of the specification;

Figure 1. shows a longitudinal cross section of a hub shell embodying this invention; and Figure 2. is a detail enlarged section of the spoke hole formation.

The hub shell 1 preferably of pressed steel has a bell shaped inner end 2. Within this end is inserted an annular member 3 of Z shape in cross section.

The outer bend 4 of the member 3 fits closely against the inner surface of the hub shell while the inner bend 5 contacts with the hub shell at its end only.

On the bend 5 are provided segments 6 which coact with corresponding segments on an inner hub (not shown) in the manner disclosed in the application referred to above.

Spoke holes 7 are provided in the shell 1 and member 3 through which spokes 8 are laced. As shown in Fig. 2 the spoke hole 7 is provided with an enlarged inner end 9 into which the head 10 of the spoke fits. A similar enlargement 11 is provided for the front spokes 12 which as here shown are laced into the hub shell.

The Z shape of the annular member forms, as will be apparent from an examination, a truss action preventing the collapse of the bell shaped end 2 of the shell.

A flange 13 turned down beyond the bend 4 positions the member 3 longitudinally in place. While the spokes 8 will hold the annular member against rotation it may prove desirable to weld the member in place.

One form only of this invention has been described it is obvious however, that other embodiments may be made without departing from the spirit and scope of the invention as set forth in the annexed claims.

I claim—

1. The combination with a hub shell, of an annular member, of Z form in cross section, inserted in the inner end of said shell, one bend of said member being provided with a driving surface, and spokes laced through the other bend of said member and the hub shell.

2. The combination with a hub shell having a bell shaped end, of an annular member inserted in said end, said member having a driving portion, a flange on said hub shell turned down over one end of said member, and spokes laced through said member and said hub shell.

In testimony whereof I affix my signature.

HENRY A. HOUSE, JR.